(12) United States Patent
Müller et al.

(10) Patent No.: US 7,612,125 B2
(45) Date of Patent: Nov. 3, 2009

(54) INK AND METHOD OF USING THE INK

(75) Inventors: Anke Müller, Creussen (DE); Stefan Engel, Rückersdorf (DE)

(73) Assignee: J.S. Staedtler GmbH & Co., Nürnberg (DE)

( * ) Notice: Subject to any disclaimer, the term of this patent is extended or adjusted under 35 U.S.C. 154(b) by 37 days.

(21) Appl. No.: 12/075,577

(22) Filed: Mar. 11, 2008

(65) Prior Publication Data

US 2008/0161457 A1 Jul. 3, 2008

Related U.S. Application Data

(62) Division of application No. 10/962,082, filed on Oct. 8, 2004, now abandoned.

(30) Foreign Application Priority Data

Oct. 9, 2003 (DE) .................................. 103 47 034

(51) Int. Cl.
*C09D 11/00* (2006.01)

(52) U.S. Cl. ............... 523/160; 523/161; 106/31.85; 106/31.86; 347/68; 347/102

(58) Field of Classification Search ............... 523/160, 523/161; 106/31.85, 31.86; 347/68, 102
See application file for complete search history.

(56) References Cited

U.S. PATENT DOCUMENTS

| | | | | | |
|---|---|---|---|---|---|
| 5,106,417 | A | * | 4/1992 | Hauser et al. ............... | 524/104 |
| 5,156,675 | A | * | 10/1992 | Breton et al. ............ | 106/31.43 |
| 5,316,575 | A | * | 5/1994 | Lent et al. ................ | 106/31.06 |
| 5,512,089 | A | * | 4/1996 | Thakkar .................... | 523/122 |
| 5,640,187 | A | * | 6/1997 | Kashiwazaki et al. ....... | 347/101 |
| 5,889,083 | A | * | 3/1999 | Zhu .......................... | 523/161 |
| 5,969,005 | A | * | 10/1999 | Yamashita et al. .......... | 523/161 |
| 7,137,694 | B2 | * | 11/2006 | Ferran et al. ................ | 347/102 |

FOREIGN PATENT DOCUMENTS

| | | | |
|---|---|---|---|
| DE | 10055744 | * | 5/2002 |
| EP | 509109 A1 | * | 4/1991 |
| EP | 997301 A2 | * | 10/1999 |
| EP | 0974626 | * | 1/2000 |
| EP | 0997301 | * | 5/2000 |
| EP | 1293545 | * | 3/2003 |

* cited by examiner

*Primary Examiner*—Bernard Lipman
(74) *Attorney, Agent, or Firm*—Friedrich Kueffner

(57) ABSTRACT

A pigmented ink for printing on untreated vinyl foils or substrates coated with vinyl by means of piezoelectric printing systems which include at least one heating device, wherein the ink is composed of a liquid carrier substance, water insoluble coloring agents, polymeric binding agents, drying decelerators, as well as additional additives, wherein the liquid carrier substance is composed of water and drying decelerators which are mixable in water. The liquid carrier substance has a content of at least 80% by weight water and the content of drying decelerators is composed of at least butyldiglycol and 1-metaxipropanol-2, and the ink has a pH-value of greater than 8.5.

8 Claims, No Drawings

INK AND METHOD OF USING THE INK

CROSS-REFERENCE TO RELATED APPLICATIONS

This application is a Divisional Application of U.S. application Ser. No. 10/962,082 filed Oct. 8, 2004, now abandoned.

BACKGROUND OF THE INVENTION

1. Field of the Invention

The present invention relates to an aqueous ink or set of inks for printing uncoated vinyl foils or substrates which are coated with vinyl. The present invention also relates to a method of using the ink.

2. Description of the Related Art

Inks for printing foils are known in principle.

When printing vinyl foils, it is necessary to distinguish between the coatings of coated and uncoated foils.

For printing uncoated foils, special inks on a non-aqueous basis are known, wherein these inks are also referred to as so-called solvent inks.

These inks have the disadvantage that they have a strong and unpleasant odor, are damaging to health and are flammable. This is also partially true for so-called ECO-solvent inks or light-solvent inks. Another disadvantage is to be seen in the fact that solvent inks can only be used in so-called solvent printers which are very expensive. There is no doubt that the above-described solvent inks dissolve the substrate and partially or fully roughen the substrate, so that the dried printed line has a good resistance to stretching.

The use of solvent printers has the disadvantage that these printers have a large structural size because due to the use of organic solvents, such as butylglycol acetate, suction installations or encapsulations must be provided for protecting the operating personnel. In addition, solvent printers are more expensive than printers for aqueous systems because the components used in the systems, such as hoses, must be resistant to organic solvents.

In addition, special foils can be printed with conventional aqueous inks if the vinyl foils are provided with a coating or a rough surface or are otherwise roughened.

However, the decisive disadvantage is the fact that the foils having special coatings are always extremely expensive. The special coatings have a rough surface and a defined porosity in order to impart a good resistance to scratching to the printed images or lines produced with aqueous inks on such foils.

In addition, EP 0 974 626 A1 discloses an aqueous pigment ink for printing uncoated vinyl substrates. This ink is composed of an aqueous carrier medium, a drying decelerator, a coloring agent which cannot be dissolved, a dispersing agent and a wetting agent. Such ink has the disadvantage that it does not dry well because of the high proportion of drying decelerator on the basis of glycols. In addition, after printing, the inks have the tendency to blur or even smudge. The printed images must be dried after the printing process at high temperatures. Moreover, it has been found to be disadvantageous that these inks are only resistant to scratching after a complicated drying process at temperatures of about 200° C.

For drying the printed images produced in the above-described manner, printers with heating devices are known in the art. The heating devices are constructed essentially plate-shaped and arranged in such a way that the substrate to be printed upon slides over the surfaces of the plates in order to heat the substrate. The printing process is followed with respect to location and time by another heating zone which dries the printed ink. The disadvantage of printers constructed in this manner is the fact that two heating zones are necessary for safely drying the ink on the substrate.

SUMMARY OF THE INVENTION

Therefore, it is the primary object of the present invention to provide an aqueous ink for printing uncoated or untreated vinyl substrates which does not have the above-discussed disadvantages and which dries quickly after printing and ensures a high resistance to scratching. Another object of the invention is to provide an ink which is waterproof after drying.

In accordance with the present invention these objects are met by a pigmented ink for printing on untreated vinyl foils or substrates coated with vinyl by means of piezoelectric printing systems which include at least one heating device, wherein the ink is composed of a liquid carrier substance, water insoluble coloring agents, polymeric binding agents, drying decelerators, as well as additional additives, wherein the liquid carrier substance is composed of water and drying decelerators which are mixable in water. The liquid carrier substance has a content of at least 80% by weight water and the content of drying decelerators is composed of at least butyldiglycol and 1-metaxipropanol-2, and the ink has a pH-value of greater than 8.5.

DETAILED DESCRIPTION OF THE INVENTION

The ink according to the present invention for printing untreated vinyl foils or substrates coated with vinyl by means of ink-jet printing systems is composed of a liquid carrier substance, water insoluble coloring agents, polymeric binding agents as well as other additives, wherein the liquid carrier substance is composed of water and water-mixable decelerators, wherein the liquid carrier substance has a content of at least 75% by weight water, preferably 80% by weight water.

An additive of the ink is a pH-regulator or adjusting agent, an amine containing substance, which constitutes a content of between 0.5 and 10% by weight of the ink composition.

The binding agent used in the ink, for example, an acrylate resin, is present in the basic range in a dissolved form, while the acrylate resin is insoluble in the acid or neutral range.

At the time of printing, the ink according to the present invention has a pH-value of greater than 7.5, preferably greater than 8.5; this has the result that the binding agent is present in a dissolved form in the ink. By effecting a desired change of the pH-value from the basic range in the direction toward the acid range, wherein the change is controlled in a targeted manner through the quantity of the pH-adjusting agent, the binding agent is hardened. Since the amine, an involatile substance, evaporates after the printing process, this results, because of the increasingly lower proportion of amines, in a pH change toward the acid range, so that the binding agent hardens and produces a dried ink layer which is resistant to scratching on the printing medium.

Inks of this type are used in inkjet printing systems, especially when the piezotechnology is used.

The invention will now be described in more detail using the following ink examples:

EXAMPLE 1

Framework Example

| | |
|---|---|
| 20 to 90% by weight | water as solvent |
| 5 to 40% by weight | drying decelerator |
| 0.5 to 20% by weight | binding agent |
| 1 to 50% by weight | coloring agent |
| 0.5 to 10% by weight | pH regulator |
| 0.01 to 1% by weight | conservation agent |
| 0.05 to 2% by weight | wetting agent |
| 0 to 5% by weight | additional additives |

EXAMPLE 2

Black

| | |
|---|---|
| 51.9 by weight % | water as solvent |
| 12.0 by weight % | drying decelerator |
| 5.0 by weight % | binding agent |
| 25.0 by weight % | pigment black |
| 5.0 by weight % | pH regulator |
| 0.1 by weight % | conservation agent |
| 1.0 by weight % | wetting agent |

EXAMPLE 3

Magenta

| | |
|---|---|
| 60.5 by weight % | water as solvent |
| 13.0 by weight % | drying decelerator |
| 7.4 by weight % | binding agent |
| 16.0 by weight % | pigment red 122 |
| 2.0 by weight % | pH regulator |
| 0.1 by weight % | conservation agent |
| 1.0 by weight % | wetting agent |

EXAMPLE 3

Magenta Light

| | |
|---|---|
| 73.6 by weight % | deionized water |
| 13.0 by weight % | butyldiglycol + Solvenon |
| 5.0 by weight % | binding agent |
| 5.3 by weight % | Chinacridon complex |
| 2.0 by weight % | ammonia solution |
| 0.1 by weight % | Grotan Bk |
| 1.0 by weight % | silicon tenside |

EXAMPLE 5

Cyan

| | |
|---|---|
| 64.9 by weight % | deionized water |
| 13.0 by weight % | butyldiglycol + Solvenon |
| 5.0 by weight % | binding agent |
| 11.0 by weight % | pigment blue 15 |
| 5.0 by weight % | dimethylethanolamine |
| 0.1 by weight % | Proxel G |
| 1.0 by weight % | fatty alcohol polyglycol ether |

EXAMPLE 6

Cyan Light

| | |
|---|---|
| 72.3 by weight % | deionized water |
| 13.0 by weight % | butyldiglycol + Solvenon |
| 5.0 by weight % | binding agent |
| 3.6 by weight % | Phlalocyanine Complex |
| 5.0 by weight % | dimethylethanol amine |
| 0.1 by weight % | Grotan Bk |
| 1.0 by weight % | silicone tenside |

EXAMPLE 7

Yellow

| | |
|---|---|
| 53.4 by weight % | deionized water |
| 13.0 by weight % | butyldiglycol + Solvenon |
| 5.0 by weight % | binding agent |
| 22.5 by weight % | pigment yellow 155 |
| 5.0 by weight % | dimethylethanol amine |
| 0.1 by weight % | Grotan Bk |
| 1.0 by weight % | fatty alcohol polyglycol ether |

Each of the inks of examples 1-7 contains water as the primary solvent. The ink contains drying decelerators as the liquid carrier substance. Drying decelerators are, for example, glycols, such as butylglycols or diethyleneglycoles and solvenon.

The ink according to the present invention has at least one amine or amine-containing substance for adjusting the pH-value. Through the basic amines or basic amine-containing substances, the ink produced with these compounds becomes basic, so that additionally the wear at the printing head is minimized, and the durability of the ink supply systems is extended. The ink has a pH-value of greater than 7.5, preferably greater than 8.5.

Examples of the amines are ethanol amine, triethanol amine, an ammonia solution, diethanol amine as well as mixtures of these amines.

The amines utilized in the ink can be described with a general formula N(R1 R2 R3), wherein the free residues R1, R2 and R3 can independently of each other be a hydrogen group, a methyl group, an ethylene group or an ethanol group ($CH_2 CH_2 OH$).

Pigments can be used as coloring agents. Examples of yellow pigments are pigment yellow 155, 150, 13 and 74. As representatives of red pigments should be mentioned pigment red 122 or generally pigments having a Chinacridon complex. Blue pigments may be pigment blue 15:3, 15 or a pigment with a phtalocyanine complex. Pigment black 7 or generally soot dispersions are examples for black inks.

It is insignificant in this connection whether the pigments serving as coloring agents are present in a dry or dispersed form. These dispersions are also called color concentrates and are generally aqueous pigment dispersions whose solid content does generally not exceed 40% by weight.

As a rule, the inks according to the present invention are sold in sets of inks, so that the entire color spectrum can be printed in the case of color printing. Such a set of inks contains the colors cyan, magenta, yellow, black and/or the light colors of cyan and magenta.

Conservation agents may be, for example, triazine or solutions of isothiazolinone derivatives. Examples of some commercially available products are Proxel G, Grotan Bk, Parmetol K 40 or Parmetol A 28.

The wetting agents used in the inks according to the present invention are fluorotenside, silicon tensides and/or fatty alcohol polyglycol ethers.

An ink of this type is used for printing untreated vinyl foils or substrates coated with vinyl by means of ink-jet systems which have at least one heating device in the form of a heating plate and/or an infrared heater.

The heating plate may be arranged directly underneath in front of and/or following the printing head, wherein the heating plate extends over the entire path along which the printing head travels. As an alternative or additionally the heating device may be constructed as an infrared radiator which is arranged above the surface to be printed.

While specific embodiments of the invention have been shown and described in detail to illustrate the inventive principles, it will be understood that the invention may be embodied otherwise without departing from such principles.

We claim:

1. A pigmented ink for printing on untreated vinyl foils or substrates coated with vinyl using piezoelectric printing systems including at least one heating device, the ink comprising
    a liquid carrier substance,
    water insoluble coloring agents,
    polymeric binding agents,
    drying decelerators,
    additional additives, wherein
    the liquid carrier substance is comprised of water and water mixable drying decelerators, wherein
    the liquid carrier substance has a content of at least 80% by weight water, wherein
    the content of drying decelerators is comprised of at least butyldiglycol and 1-methoxypropanol-2, and wherein the ink has a pH-value of greater than 8.5, further comprising wetting agents selected from fluorotensides, silicon tensides and fatty alcohol polyglycol ethers.

2. The ink according to claim 1, further comprising a pH-regulator, wherein the pH-regulator is an amine or amine-containing substance, and wherein the amine or the amine-containing substance is basic.

3. The ink according to claim 2, wherein the amine is a dimethylethanol amine, a triethanol amine, an ammonia solution, or a mixture of these substances.

4. The ink according to claim 1, wherein the binding agent is present in the liquid ink in a dissolved form.

5. The ink according to claim 1, wherein the ink comprises

| | |
|---|---|
| 20 to 90% by weight | water as solvent |
| 5 to 40% by weight | drying decelerator |
| 0.5 to 20% by weight | binding agent |
| 1 to 50% by weight | coloring agent |
| 0.5 to 10% by weight | pH regulator |
| 0.01 to 1% by weight | conservation agent |
| 0.05 to 2% by weight | wetting agent |
| 0 to 5% by weight | additional additives. |

6. A method of using an ink or an ink set in an ink-jet printing system which comprises
    a liquid carrier substance,
    water insoluble coloring agents,
    polymeric binding agents,
    drying decelerators,
    additional additives, wherein the liquid carrier substance is comprised of water and water mixable drying decelerators, wherein
    the liquid carrier substance has a content of at least 80% by weight water, wherein the content of drying decelerators is comprised of at least butyldiglycol and 1-methoxypropanol-2, and wherein the ink has a pH-value of greater than 8.5, further comprising wetting agents selected from fluorotensides, silicon tensides and fatty alcohol polyglycol ethers.

7. The method according to claim 6, wherein a heating plate is arranged directly below and in front of and/or following a printing head of the printing system, wherein the heating plate is arranged so as to extend over an entire path traveled by the printing head.

8. The method according to claim 7, wherein the heating plate is an infrared radiator arranged above a surface to be printed.

* * * * *